(12) United States Patent
Kirsch et al.

(10) Patent No.: US 8,117,286 B2
(45) Date of Patent: **\*Feb. 14, 2012**

(54) METHOD AND APPARATUS FOR REDIRECTION OF SERVER EXTERNAL HYPER-LINK REFERENCES

(75) Inventors: Steven T. Kirsch, Los Altos, CA (US); Christopher J. Lindblad, Oakland, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/660,423

(22) Filed: Feb. 26, 2010

(65) Prior Publication Data

US 2010/0217797 A1    Aug. 26, 2010

Related U.S. Application Data

(63) Continuation of application No. 11/031,100, filed on Jan. 6, 2005, now Pat. No. 7,702,752, which is a continuation of application No. 10/190,341, filed on Jul. 3, 2002, now Pat. No. 6,859,833, which is a continuation of application No. 09/655,999, filed on Jun. 6, 2000, now Pat. No. 6,466,966, which is a continuation of application No. 09/071,674, filed on May 1, 1998, now Pat. No. 6,189,030, which is a continuation-in-part of application No. 08/999,727, filed on Dec. 23, 1997, now Pat. No. 5,870,546, which is a continuation of application No. 08/604,468, filed on Feb. 21, 1996, now Pat. No. 5,751,956.

(51) Int. Cl.
    *G06F 15/16* (2006.01)

(52) U.S. Cl. .................... 709/219; 709/203; 709/229

(58) Field of Classification Search .................. 709/203, 709/217–219, 225, 229
See application file for complete search history.

(56) References Cited

U.S. PATENT DOCUMENTS

| 3,615,681 A | 10/1971 | DuRoss |
| 3,803,491 A | 4/1974 | Osborn |

(Continued)

FOREIGN PATENT DOCUMENTS

AU    699439    12/1998

(Continued)

OTHER PUBLICATIONS

Office Action mailed Jan. 15, 2004, for related U.S. Appl. No. 10/190,341.

(Continued)

*Primary Examiner* — Abdullahi Salad
(74) *Attorney, Agent, or Firm* — Farjami & Farjami LLP.

(57) ABSTRACT

A message is provided to a tracking server system in response to a client system referencing a predetermined resource locator that corresponds to a resource external to the tracking server system. The tracking server system indirectly provides for the client system to have an informational element selectable by the client system, where the informational element is graphically identified on the client system with informational content obtainable from a content server system through use of a content resource locator. The informational element includes a tracking resource locator, referencing the tracking server system, and data identifying the informational element. The selection of the informational element causes the client system to use the tracking resource locator to provide the data to the tracking server system and to use the content resource locator to obtain the informational content from the content server system.

20 Claims, 3 Drawing Sheets

U.S. PATENT DOCUMENTS

| | | |
|---|---|---|
| 3,891,792 A | 6/1975 | Kimura |
| 4,163,255 A | 7/1979 | Pires |
| 4,247,106 A | 1/1981 | Jeffers |
| 4,264,925 A | 4/1981 | Freeman |
| 4,323,922 A | 4/1982 | den |
| 4,335,157 A | 6/1982 | Varvil |
| 4,525,779 A | 6/1985 | Davids |
| 4,528,589 A | 7/1985 | Block |
| 4,547,851 A | 10/1985 | Kurland |
| 4,555,781 A | 11/1985 | Baldry |
| RE32,187 E | 6/1986 | Barda |
| 4,595,951 A | 6/1986 | Filliman |
| 4,595,952 A | 6/1986 | Filliman |
| 4,602,279 A | 7/1986 | Freeman |
| 4,636,858 A | 1/1987 | Hague |
| 4,654,482 A | 3/1987 | DeAngelis |
| 4,680,629 A | 7/1987 | Fukushima |
| 4,694,490 A | 9/1987 | Harvey |
| 4,704,725 A | 11/1987 | Harvey |
| 4,712,131 A | 12/1987 | Tanabe |
| 4,724,521 A | 2/1988 | Carron |
| 4,734,858 A | 3/1988 | Schlafly |
| 4,739,310 A | 4/1988 | Yamamoto |
| 4,740,912 A | 4/1988 | Whitaker |
| 4,744,080 A | 5/1988 | Brennand |
| 4,757,498 A | 7/1988 | Murray |
| 4,766,599 A | 8/1988 | Miyazaki |
| 4,789,985 A | 12/1988 | Akahoshi |
| 4,825,354 A | 4/1989 | Agrawal |
| 4,851,994 A | 7/1989 | Toda |
| 4,885,789 A | 12/1989 | Burger |
| 4,894,789 A | 1/1990 | Yee |
| 4,908,707 A | 3/1990 | Kinghorn |
| 4,924,303 A | 5/1990 | Brandon |
| 4,926,255 A | 5/1990 | Von |
| 4,935,870 A | 6/1990 | Burk |
| 4,937,784 A | 6/1990 | Masai |
| 4,965,825 A | 10/1990 | Harvey |
| 4,975,771 A | 12/1990 | Kassatly |
| 4,982,440 A | 1/1991 | Dufresne |
| 4,991,011 A | 2/1991 | Johnson |
| 5,003,591 A | 3/1991 | Kauffman |
| 5,005,171 A | 4/1991 | Modisette |
| 5,010,499 A | 4/1991 | Yee |
| 5,036,314 A | 7/1991 | Barillari |
| 5,047,614 A | 9/1991 | Bianco |
| 5,057,915 A | 10/1991 | Von |
| 5,063,507 A | 11/1991 | Lindsey |
| 5,075,773 A | 12/1991 | Pullen |
| 5,093,718 A | 3/1992 | Hoarty |
| 5,111,292 A | 5/1992 | Kuriacose |
| 5,115,309 A | 5/1992 | Hang |
| 5,121,476 A | 6/1992 | Yee |
| 5,129,080 A | 7/1992 | Smith |
| 5,132,992 A | 7/1992 | Yurt |
| 5,144,425 A | 9/1992 | Joseph |
| 5,148,275 A | 9/1992 | Blatter |
| 5,168,356 A | 12/1992 | Acampora |
| 5,168,446 A | 12/1992 | Wiseman |
| 5,181,238 A | 1/1993 | Medamana |
| 5,191,410 A | 3/1993 | McCalley |
| 5,191,573 A | 3/1993 | Hair |
| 5,195,092 A | 3/1993 | Wilson |
| 5,204,947 A | 4/1993 | Bernstein |
| 5,208,748 A | 5/1993 | Flores |
| 5,220,420 A | 6/1993 | Hoarty |
| 5,220,655 A | 6/1993 | Tsutsui |
| 5,221,838 A | 6/1993 | Gutman |
| 5,221,968 A | 6/1993 | Bugg |
| 5,227,874 A | 7/1993 | Von |
| 5,233,654 A | 8/1993 | Harvey |
| 5,235,415 A | 8/1993 | Bonicel |
| 5,251,301 A | 10/1993 | Cook |
| 5,283,734 A | 2/1994 | Von |
| 5,285,383 A | 2/1994 | Lindsey |
| 5,299,197 A | 3/1994 | Schlafly |
| 5,303,393 A | 4/1994 | Noreen |
| 5,329,589 A | 7/1994 | Fraser |
| 5,339,392 A | 8/1994 | Risberg |
| 5,343,239 A | 8/1994 | Lappinton |
| 5,347,632 A | 9/1994 | Flipp |
| 5,355,170 A | 10/1994 | Eitz |
| 5,359,508 A | 10/1994 | Rossides |
| 5,418,559 A | 5/1995 | Blahut |
| 5,440,632 A | 8/1995 | Bacon |
| 5,440,744 A | 8/1995 | Jacobson |
| 5,444,192 A | 8/1995 | Shetye |
| 5,448,633 A | 9/1995 | Jamaleddin |
| 5,451,998 A | 9/1995 | Hamrick |
| 5,457,797 A | 10/1995 | Butterworth |
| 5,485,197 A | 1/1996 | Hoarty |
| 5,491,820 A | 2/1996 | Belove |
| 5,497,185 A | 3/1996 | Dufresne |
| 5,513,117 A | 4/1996 | Small |
| 5,515,268 A | 5/1996 | Yoda |
| 5,530,852 A | 6/1996 | Meske |
| 5,539,449 A | 7/1996 | Blahut |
| 5,548,532 A | 8/1996 | Menand |
| 5,550,734 A | 8/1996 | Tarter |
| 5,560,008 A | 9/1996 | Johnson |
| 5,570,389 A | 10/1996 | Rossi |
| 5,572,643 A | 11/1996 | Judson |
| 5,581,270 A | 12/1996 | Smith |
| 5,581,704 A | 12/1996 | Barbara |
| 5,583,937 A | 12/1996 | Ullrich |
| 5,600,364 A | 2/1997 | Hendricks |
| 5,604,682 A | 2/1997 | McLaughlin |
| 5,611,040 A | 3/1997 | Brewer |
| 5,613,012 A | 3/1997 | Hoffman |
| 5,621,456 A | 4/1997 | Florin |
| 5,625,781 A | 4/1997 | Cline |
| 5,640,193 A | 6/1997 | Wellner |
| 5,642,418 A | 6/1997 | Farris |
| 5,646,992 A | 7/1997 | Subler |
| 5,659,732 A | 8/1997 | Kirsch |
| 5,666,293 A | 9/1997 | Metz |
| 5,666,493 A | 9/1997 | Wojcik |
| 5,668,592 A | 9/1997 | Spaulding |
| 5,671,279 A | 9/1997 | Elgamal |
| 5,675,507 A | 10/1997 | Bobo |
| 5,678,041 A | 10/1997 | Baker |
| 5,692,132 A | 11/1997 | Hogan |
| 5,696,898 A | 12/1997 | Baker |
| 5,706,435 A | 1/1998 | Barbara |
| 5,706,507 A | 1/1998 | Schloss |
| 5,708,780 A * | 1/1998 | Levergood et al. ........... 709/229 |
| 5,710,887 A | 1/1998 | Chelliah |
| 5,710,918 A | 1/1998 | Lagarde |
| 5,712,979 A | 1/1998 | Graber |
| 5,717,860 A | 2/1998 | Graber |
| 5,719,941 A | 2/1998 | Swift |
| 5,724,424 A | 3/1998 | Gifford |
| 5,724,472 A | 3/1998 | Abecassis |
| 5,727,163 A | 3/1998 | Bezos |
| 5,729,549 A | 3/1998 | Kostreski |
| 5,734,589 A | 3/1998 | Kostreski |
| 5,737,595 A | 4/1998 | Cohen |
| 5,745,681 A | 4/1998 | Levine |
| 5,751,956 A | 5/1998 | Kirsch |
| 5,751,961 A | 5/1998 | Smyk |
| 5,752,246 A | 5/1998 | Rogers |
| 5,758,126 A | 5/1998 | Daniels |
| 5,761,499 A | 6/1998 | Sonderegger |
| 5,764,906 A | 6/1998 | Edelstein |
| 5,768,539 A | 6/1998 | Metz |
| 5,774,670 A | 6/1998 | Montulli |
| 5,778,367 A | 7/1998 | Wesinger |
| 5,781,550 A | 7/1998 | Templin |
| 5,790,793 A | 8/1998 | Higley |
| 5,794,006 A | 8/1998 | Sanderman |
| 5,794,210 A | 8/1998 | Goldhaber |
| 5,802,299 A | 9/1998 | Logan |
| 5,805,825 A | 9/1998 | Danneels |
| 5,809,483 A | 9/1998 | Broka |
| 5,812,769 A * | 9/1998 | Graber et al. ................ 709/228 |
| 5,812,776 A * | 9/1998 | Gifford ........................ 709/217 |
| 5,819,034 A | 10/1998 | Joseph |

| | | | |
|---|---|---|---|
| 5,819,285 | A | 10/1998 | Damico |
| 5,822,324 | A | 10/1998 | Kostreski |
| 5,826,166 | A | 10/1998 | Brooks |
| 5,845,260 | A | 12/1998 | Nakano |
| 5,845,265 | A | 12/1998 | Woolston |
| 5,848,399 | A | 12/1998 | Burke |
| 5,855,020 | A | 12/1998 | Kirsch |
| 5,857,175 | A | 1/1999 | Day |
| 5,860,862 | A | 1/1999 | Junkin |
| 5,870,546 | A | 2/1999 | Kirsch |
| 5,870,716 | A | 2/1999 | Sugiyama |
| 5,870,717 | A | 2/1999 | Wiecha |
| 5,870,724 | A | 2/1999 | Lawlor |
| 5,878,141 | A | 3/1999 | Daly |
| 5,887,062 | A | 3/1999 | Maeda |
| 5,893,076 | A | 4/1999 | Hafner |
| 5,894,554 | A | 4/1999 | Lowery |
| 5,905,736 | A | 5/1999 | Ronen |
| 5,909,492 | A | 6/1999 | Payne |
| 5,918,213 | A | 6/1999 | Bernard |
| 5,926,168 | A | 7/1999 | Fan |
| 5,935,004 | A | 8/1999 | Tarr |
| 5,935,207 | A | 8/1999 | Logue |
| 5,936,659 | A | 8/1999 | Viswanathan |
| 5,948,040 | A | 9/1999 | DeLorme |
| 5,948,061 | A | 9/1999 | Merriman |
| 5,951,639 | A | 9/1999 | Macinnis |
| 5,960,409 | A | 9/1999 | Wexler |
| 5,960,411 | A | 9/1999 | Hartman |
| 5,963,915 | A | 10/1999 | Kirsch |
| 5,963,924 | A | 10/1999 | Williams |
| 5,973,684 | A | 10/1999 | Brooks |
| 5,973,747 | A | 10/1999 | Goreta |
| 5,978,773 | A | 11/1999 | Hudetz |
| 5,978,855 | A | 11/1999 | Metz |
| 6,009,413 | A | 12/1999 | Webber |
| 6,018,619 | A | 1/2000 | Allard |
| 6,029,175 | A | 2/2000 | Chow |
| 6,052,730 | A | 4/2000 | Felciano |
| 6,073,241 | A | 6/2000 | Rosenberg |
| 6,130,898 | A | 10/2000 | Kostreski |
| 6,130,933 | A | 10/2000 | Miloslavsky |
| 6,134,592 | A | 10/2000 | Montulli |
| 6,185,585 | B1 | 2/2001 | Sequeira |
| 6,188,436 | B1 | 2/2001 | Williams |
| 6,189,030 | B1 | 2/2001 | Kirsch |
| 6,195,364 | B1 | 2/2001 | Brodigan |
| 6,222,530 | B1 | 4/2001 | Sequeira |
| 6,240,448 | B1 | 5/2001 | Imielinski |
| 6,247,047 | B1 | 6/2001 | Wolff |
| 6,269,370 | B1 | 7/2001 | Kirsch |
| 6,298,356 | B1 | 10/2001 | Jawahar |
| 6,389,462 | B1 | 5/2002 | Cohen |
| 6,466,966 | B1 | 10/2002 | Kirsch |
| 6,486,891 | B1 | 11/2002 | Rice |
| 6,507,823 | B1 | 1/2003 | Nel |
| 6,577,734 | B1 | 6/2003 | Etzel |
| 6,578,078 | B1 * | 6/2003 | Smith et al. .................. 709/224 |
| 6,643,696 | B2 | 11/2003 | Davis |
| 6,654,807 | B2 | 11/2003 | Farber |
| 6,859,833 | B2 | 2/2005 | Kirsch |
| 2002/0082938 | A1 | 6/2002 | Borger |

FOREIGN PATENT DOCUMENTS

| | | |
|---|---|---|
| AU | 3769699 | 11/1999 |
| AU | 754298 | 11/2002 |
| CA | 2235014 | 4/1997 |
| CA | 2294935 | 11/1999 |
| EP | 0145063 | 6/1985 |
| EP | 0306208 | 3/1989 |
| EP | 0399300 | 11/1990 |
| EP | 0570683 | 11/1993 |
| EP | 0593186 | 2/1994 |
| EP | 0680185 | 2/1995 |
| EP | 0845747 | 6/1998 |
| EP | 0855659 | 7/1998 |
| EP | 0855687 | 7/1998 |
| EP | 0856180 | 8/1998 |
| EP | 0883076 | 12/1998 |
| EP | 0993726 | 4/2000 |
| EP | 95105803 | 5/2002 |
| GB | 2280977 | 2/1995 |
| JP | 2002507308 | 3/2002 |
| WO | 95/30961 | 11/1995 |
| WO | 96/17466 | 6/1996 |
| WO | 96/38799 | 12/1996 |
| WO | 97/15020 | 4/1997 |
| WO | 98/03923 | 1/1998 |
| WO | 98/21679 | 5/1998 |
| WO | 98/53406 | 11/1998 |
| WO | 99/57865 | 11/1999 |
| WO | 00/49801 | 8/2000 |

OTHER PUBLICATIONS

Amendment as filed on Jun. 15, 2004, for related U.S. Appl. No. 10/190,341.

Preliminary Amendment as filed on Jun. 6, 2000, for related U.S. Appl. No. 09/655,999.

Office Action mailed Aug. 13, 2001, for related U.S. Appl. No. 09/655,999.

Amendment as filed on Nov. 30, 2001, for related U.S. Appl. No. 09/655,999.

Office Action mailed Nov. 26, 1999, for related U.S. Appl. No. 09/071,674.

Amendment as filed on Apr. 26, 2000, for related U.S. Appl. No. 09/071,674.

Preliminary Amendment as filed on Dec. 23, 1997, for related U.S. Appl. No. 08/999,727.

Examiner's Statement of Reasons for Allowance mailed Sep. 16, 1998, for related U.S. Appl. No. 08/999,727.

Examiner's Supplemental Notice of Allowability mailed Oct. 15, 1998, for related U.S. Appl. No. 08/999,727.

Examiner's Statement of Reasons for Allowance mailed Oct. 2, 1997, for related U.S. Appl. No. 08/604,468.

Amendment Under 37 CFR 1.312(a) as filed Dec. 23, 1997, for related U.S. Appl. No. 08/604,468.

Response to Rule 312 Communication mailed Feb. 17, 1998, for related U.S. Appl. No. 08/604,468.

Office Action mailed Apr. 29, 1997, for related U.S. Appl. No. 08/604,584.

Amendment filed Oct. 27, 1997, for related U.S. Appl. No. 08/604,584.

Office Action mailed Dec. 24, 1997, for related U.S. Appl. No. 08/604,584.

Amendment filed Jun. 24, 1998, for related U.S. Appl. No. 08/604,584.

Office Action mailed Jun. 2, 2003, for related U.S. Appl. No. 09/970,772.

Amendment filed Nov. 3, 2003, for related U.S. Appl. No. 09/970,772.

Notice of Non-Compliant Amendment mailed Nov. 25, 2003, for related U.S. Appl. No. 09/970,772.

Response to Notice of Non-Compliant Amendment filed Dec. 2, 2003, for related U.S. Appl. No. 09/970,772.

Office Action mailed Mar. 15, 2004, for related U.S. Appl. No. 09/970,772.

Interview Summary mailed May 5, 2004, for related U.S. Appl. No. 09/970,772.

Amendment filed May 11, 2004, for related U.S. Appl. No. 09/970,772.

Office Action mailed Sep. 22, 2004, for related U.S. Appl. No. 09/970,772.

Amendment filed Oct. 15, 2004, for related U.S. Appl. No. 09/970,772.

Final Office Action mailed Jan. 26, 2005, for related U.S. Appl. No. 09/970,772.

Interview Summary mailed Apr. 7, 2005, for related U.S. Appl. No. 09/970,772.

Office Action mailed Jun. 1, 2006, for related U.S. Appl. No. 09/970,772.

Amendment filed Dec. 1, 2006, for related U.S. Appl. No. 09/970,772.

Amendment filed Mar. 5, 2007, for related U.S. Appl. No. 09/970,772.
Amendment filed Mar. 6, 2007, for related U.S. Appl. No. 09/970,772.
Office Action mailed Mar. 22, 2007, for related U.S. Appl. No. 09/970,772.
Interview Summary mailed Apr. 19, 2007, for related U.S. Appl. No. 09/970,772.
"ABC Expands Beta Testing of Web Site Measurement", Phillips Media Group's Interactive Marketing News, Potomac: Nov. 10, 1995, p. 1, 2 pages.
"Audit Bureau Works to Develop Auditing Standards", Phillips Media Group's Interactive Marketing News, Potomac, Nov. 24, 1995, p. 1, 2 pages.
"Broadvision: Personalized Marketing and Selling on the Internet Unleashed by BroadVision; One-to-One Application System Helps Marketers Build Long-Term Relationships Through Personalized Content, Services and Promotion", Business Wire, Jan. 22, 1996, 4 pages.
Copyright 2005, Elsevier, B.V. "Computer Networks and ISDN Systems", http://www.sciencedirect.com/science/journal/01697552, 2 pages.
"If You Place It, Will They Come?", Internet Week, v1, n36, Dec. 18, 1995, Abstract, 1 page.
"Marketers Offer Diverging Opinions on Web Measurement", Phillips Media Group's Interactive Marketing News, p. 1, Oct. 27, 1995, 2 versions, 2 pages.
"Media Research Powerhouses Vie to Measure Online Use Advertisers, Agencies Clamor for Third-Party Audits;" Phillips Media Group's Interactive Marketing News, p. 1, Jun. 9, 1995, 3 pages.
"New Web Tracking Tools Offer in-house Audits Marketers can Conduct their Own Audience Analysis", Phillips Media Group's Interactive Marketing News, p. 1, Aug. 4, 1995, 3 pages.
"Virtual Office, Inc Announces Web Watch, a New Service to Verify Internet Advertising and Publishing", Business Wire, Aug. 17, 1995, 3 pages.
"Appeal", *Amazon.com, Inc. v. Barnesandnoble.com, Inc. and Barnesandnoble.com, LLC*, No. C99-1695P, filed Nov. 22, 1999, United States District court, Western District of Washington in Seattle, 40 pages.
"Barnesandnoble.com's Opposition to Amazon.com's Motion for Preliminary Injunction", *Amazon.com, Inc. v. Barnesandnoble.com, Inc. and Barnesandnoble.com, LLC*, No. C99-1695P, filed Nov. 22, 1999, United States District Court, Western District of Washington at Seattle, 30 pages.
"Barnesandnoble.com's Proposed Findings of Fact and Conclusions of Law", *Amazon.com,Inc. v. Barnsandnoble.com, Inc. and Barnesandnoble.com, LLC* No. C99- 1695P, filed Nov. 22, 2999, United States District Court, Western District of Washington at Seattle, 61 pages.
"Build Long-Term Relationships Through Personalized Content, Services and Promotions", Jan. 22, 1996, Byline: Business Editors/Computer Writers; Dateline: Los Altos, CA.
"Declaration of John W. Lockwood in Support of Barnesandnoble.com's Opposition to Amazon.com's Motion for Preliminary Injunction", *Amazon.com, Inc. v. Barnesandnoble.com, Inc. and Barnesandnoble.com, LLC*, No. C99-1695P, filed Nov. 22, 1999, United States District Court, Western District of Washington at Seattle, 13 pages.
"Declaration of Professor Martin J. Adelman in Support of Barnesandnoble.com's Opposition to Amazon.com's Motion for Preliminary Injunction", *Amazon.com, Inc. v. Barnesandnoble.com, Inc. and Barnesandnoble.com, LLC*, No. C99-1695P, filed Nov. 22, 1999, United States District Court, Western District of Washington at Seattle, 3 pages.
"Declaration of Steven I. Wallach in Support of Barnesandnoble.com's Opposition to Amazon.com's Motion for Preliminary Injunction", *Amazon.com, Inc. v. Barnesandnoble.com, Inc. and Barnesandnoble.com, LLC*, No. C99-1695P, filed Nov. 22, 1999, United States District Court, Western District of Washington at Seattle, 3 pages.
"Doonesbury", by G.B. Trudeau, May 2, 1993, www.doonesbury.com, 1 page.
"Doonesbury", by G.B. Trudeau, May 3, 1993, www.doonesbury.com, 1 page.
"Doonesbury", by G.B. Trudeau, May 4, 1993, www.doonesbury.com, 1 page.
"Doonesbury", by G.B. Trudeau, May 5, 1993, www.doonesbury.com, 1 page.
"Doonesbury", by G.B. Trudeau, May 6, 1993, www.doonesbury.com, 1 page.
"Doonesbury", by G.B. Trudeau, May 7, 1993, www.doonesbury.com, 1 page.
"Doonesbury", by G.B. Trudeau, May 8, 1993, www.doonesbury.com, 1 page.
"Order on Plaintiffs Motion for Preliminary Injunction", *Amazon.com, Inc. v. Barnesandnoble.com, Inc. and Barnesandnoble.com, LLC*, No. C99-1695P, filed Nov. 22, 1999, United States District Court, Western District of Washington at Seattle, 22 pages.
"Persistent Client State HTTP Cookies", Preliminary Specification, http://www.netscape.com/newsref/std/cookie.sub.—spec.html, 1995 and other dates, 301 pages.
"Research Firms Strive For Web Tracking that Counts", Phillips Media Group Interactive Marketing News, Phillips Media Group, Potomac, Jun. 23, 1995, 3 pages.
"Saros: Saros Announces @mezzanine, the Cyber Librarian", M2 Communications, Nov. 23, 1995, 3 pages.
Acharya et al., "Broadcast Disks: Data Management for Asymmetric Communication Environments", Proceedings of the ACM Sigmod International Conference on Management of Data, San Jose, CA, Oct. 1994, 26 pages.
Achaiya et al., "Dissemination-based Data Delivery Using Broadcast Disks", IEEE Personal Communications, vol. 2(6), 50-60, 1995, 23 pages.
Adaptive Micro-Ware, Inc. LBRT167568-LBRT167571, No. date given, 5 pages.
Albright, Thomas B., "Simple Internet Purchase Procedure", http://www.bountyquest.com/images/b1025)17a.jpg, p. 1, 1996, 2 pages.
Ammar M. H. et al., "The Design of Teletext Broadcast Cycles", Elsevier Science Publishers B.V., 1985, North-Holland, pp. 235-242.
Anon, "Conference on Electronic Delivery of Data and Software", London, England, Sep. 16, 1986, Sponsor: IERE, London, England, Publ. Inst. Electron Radio Engn 69, Publ by IERE, London Engl., Abstract, 1 page.
Anonymous, "Internet Gets Shopping Mall", Information & Interactive Services Report, Apr. 22, 1994, vol. 15, No. 8, 1 page.
Anonymous, File 9 (Business & Industry .RTM.), No. 1053300, "Biznet Intros Versatile Vending for the Internet (Biznet Technologies has introduced Versatile Virtual Vending (VVV), a service that combines an innovative software engine and platform running UNIX)", Sep. 20, 1994, 5 pages.
Antonelli et al., "Integrating Mass Storage and File Systems", Proceedings, 12.sup.th IEEE Symposium on Mass Storage Systems, Monterey, CA, pp. 133-138, Apr. 26-29, 1993, 6 pages.
Barda et al., "E/System for Digitally Transmitting Displaying Texts on Television Screen", no date available, abstract, 1 page.
Bereiter, Philips, "Video-on-Demand vor, Blick durch die Wirtschaft—Beilage Zure Frankfurter Allgmeinen Zeitung", v. 37, n. 71, Apr. 4, 1994, pp. 8, translation, 1994, 2 pages.
Berners-Lee, "The World-Wide Web", Communications of the ACM, v37, n8, Aug. 1994, 8 pages.
Berners-Lee, T., "Hypertext Markup Language-2.0", Network Working Group MIT/W3C RFC 1866, Nov. 1995, 155 pages.
Blatter et al., "E/Second Video Program; Television Receiver", abstract, 1 page.
Bonicel et al., "E/Device for the Intelligible Consultation of Data Relating to the Fees Programs of a Subscription Television and/or Radio Service", no date given, abstract, 1 page.
Booker, "Seeing a Gap, A Palo Alto Startup Will Debut Advertising Server for the Net", published by Web Week, vol. 2, Issue 2, Feb. 1996, 1 page.
Bountyquest, 1-Click Patent: No Exact Match But Runners Up will Split $10,000 Cash Prize, pp. 1-3, http://www.bountyquest/infocenter/1click.htm, accessed online Sep. 26, 2002.
Bountyquest, 1-Click Prior Art, pp. 1-8, http://www.bountyquest.com/patentinfo/oneclickart.htm, accessed online Sep. 26, 2002.

Bowen et al., "The Datacycle Architecture", Communications of the ACM, vol. 35, No. 12, pp. 71-81, Dec. 1992.
Brandon et al., "E/Method and Apparatus for Providing Interactive Retrieval of TV Still Frame Images and Audio Segments", Abstract, 1 page.
Brennand et al., "E/Apparatus for Receiving Digital Sound/Data Information", Abstract, 1 page.
Brody, Herb, "Information Highway", Technology Review, Aug./Sep. 1993, vol. 96, No. 6, p. 30, 11 pages.
Brown et al., "BBC Telesoftware—3 Years On", BBC Enterprises, Ltd., London, UK, Conference on Electronic Delivery of Data and Software, Pub. No. 69, pp. 35-38, IERE London, UK, 1986, Abstract, 1 page.
Bugg et al., "E/Ideographic Teletext Transmissions", Abstract, 1 page.
Bundy, Matthew J., "SkyPix System Design", SkyPix System, Starscan, Adaptive Micro-Ware, Inc., pp. 1-18, Appendix A-1-A-8, 22 pages.
Burk et al., "E/Apparatus for Downloading Macro Programs and Executing a Downloaded Macro Program Responding to Activation of a Single Key; Information Retrieval Video Text System", Abstract, 1 page.
Carcione, Frank, Quarterly Report, Telvue Corp. 10-Q for Sep. 30, 1995, pp. 1-10, Washington, DC, http://.secinfo.com/dpJXs.a6htm, 23 pages.
Catledge, et al.; "Characterizing browsing strategies in the World-Wide Web", Computer Networks and ISDN Systems; Amsterdam; Apr. 1995, Abstract, 1 page.
Chambers, "BBC Datacast—The Transmission System", Electronics & Wireless World, Nov. 1986, vol. 92, No. 1609, pp. 95-8, UK, Abstract, 1 page.
Chouinard, "Broadcasting of HDTV: Beyond the Vision Signal", Third International Colloquium on Advanced Television Systems: SDTV '87, Colloquium Proceedings, p. 4/7/1-23, CBC Eng, Montreal, Quebec, Canada, 1998, vol. 2 (674+149), Abstract, 1 page.
Clark, Derek, "Specification", Comm Frame Data specification, Starscan, Adaptive Micro-Ware, Inc., pp. 1-121, accessed online Nov. 21, 2002, 127 pages.
Cohen et al., "E/Distributed Database System and Database Receiver Therefor", Abstract, 1 page.
Cole et al., "Oracle Spins Web Strategy", Network World, v12, n3, pp. 1 & 49, Jan. 16, 1995, 2 pages.
Cominetti et al., "Data Broadcasting Services", Cent. Ric, Torino, Italy, Electronica e Telecomunicazioni, 1990, 39 (2) 83-88, Abstract, 1 page.
Contents Table of Contents, ISPF V4R2.0 Users Guide, Oct. 9, 1995, pp. 1-9, IBM BookManager, http://publib.boulder.ibm.com/cgi-bin/bookmgr/BOOKS/ISPUGD02/CCONTENTS, 10 pages.
Copyright 1994 Business Wire, Inc., Business Wire, May 31, 1994, Tuesday Document 46 of 97, 3 pages.
Copyright 1995 Business Wire, Inc., Business Wire, Apr. 19, 1995, Wednesday, Document 51 of 69, 2 pages.
Copyright 1995 Business Wire, Inc., Business Wire, Aug. 17, 1995, Thursday, Document 4 of 17, 2 pages.
Copyright 1995 PR Newswire Association, Inc., PR Newswire, Sep. 12, 1995, Tuesday, Document 15 of 97, 2 pages.
Copyright 1995 Responsive Database Services, Inc., Business and Industry, Copyright 1995 CMP Publications, Inc., Interactive Age, Apr. 24, 1995, Document 49 of 69, 3 pages.
Copyright 1996 Business Wired, Inc., Business Wire, Jan. 22, 1996, Monday, Document 11 of 69, 2 pages.
Copyright 1996 Newspaper Publishing PLC, The Independent (London), Feb. 4, 1996, Sunday, Document 1 of 7, 2 pages.
Copyright 1996 PR Newswire ASsociation, Inc., PR Newswire, Feb. 5, 1996 Monday, Document 6 of 69, 3 pages.
D'Amato et al., "Datavideo: The New Data Broadcasting System Through Television Channels", Televideo Rai, Roma, Italy, Electronica e Telecomunicazioni, 1991, vol. 40, No. 2, pp. 65-74, Abstract, 1 page.
Davis, Jessica, "Email World/Internet Expo to Feature Web Solutions", v18, n8, p. 6, Feb. 19, 1996, 2 pages.
Diagram of Example Operation: http://www.bountyquest.com/images/b1025.sub.—17b.jpg, p. 1.

Dr. Website, "Target Attribute Frees Hotlinked External Sites for Frame Display", http://webdeveloper.com/drweb/96Oct21-drwebsite.html, 2 pages.
Eitz, Gerhard, "E/Method for Transmitting Periodically Repeated Teletex Data in a Television Receiver", Abstract, 1 page.
Electronic Marketplace Report, Bottom's Up Revolution to Transform Internet Advertising, vol. 9, No. 1, 1995, 4 pages.
El-Shishiny, Dr. Hisham et al., "A Regional Broadcast-Centric Education System", IEEE Symposibm on Computers and Communications, Alexandria, Egypt, Jul. 1-3, 1997, 13 pages.
Filliman et al., "E/Teletext Decoder Having a Register Array for Operating on Pixel Words", Abstract, 1 page.
Filliman et al., "E/Teletext Decoder Using a Common Memory", Abstract, 2712383, Derwent Accession 1985, Abstract, 1 page.
Florida Today Space Online, "GE Spacenet to Merge with Gilat", http://www.floridatoday.com/space/explore/sotries/1998b/100498f.htm, Oct. 4, 1998, 3 pages.
Frook, John Evan, "Tracking Goes Mainstream", Communications Week, Manhasset; Sep. 18, 1995, Abstract, 1 page.
Fujimoto et al., "Matushita Data Multiplex Systems for Satellite Communications", National Technical Report, vol. 39, No. 3, pp. 316-323, Jun. 1.993, Japan, Abstract, 1 page.
Fukushima et al., "E/Display Unit", Abstract, no date given, 1 page.
Gibbs, Mark, "Stating the case for the state", Network World, Nov. 20, 1995, vol. 12, No. 47, p. 37, 2 pages.
Gifford et al., The Application of Digital Broadcast Communication to Large Scale Information Systems; IEEE Journal on Selected Areas in Communications, vol. SAC-3, No. 3, May 1985, 11 pages.
Gifford, D.K., "Polychannel Systems for Mass Digital Communication", Communications of ACM, vol. 33, No. 2, Feb. 1990, 13 pages.
Goreta et al., "E/Television Program Management System", 1995, Abstract, 1 page.
Green et al., Oracle on Independent Television; Sep. 1976, 1 page.
Greenspun, Philip, "Chapter 14: Ecommerce; Philip and Alex's Guide to Web Publishing", No date given, pp. 1-31, http://www.arsdigita.com/books/panda/ecommeree, 22 pages.
Guenot, a., "CIDAC: Integrated Circuit for Acquisition and Control (in Teletext)", RTC-Competec, Paris, France, Acta Eletraonica, 1985, vol. 27, Nos. 1-2, pp. 139-144, Abstract, 1 page.
Hague et al., "E/Extracting digital Data from a Bus and Multiplexing it with a Video Signal", Abstract, 1 page.
Hedger, J., "Broadcast Telesoftware: Experience with Oracle"; Online Conferences Ltd., Sep. 1976, 19 pages.
Herman et al., the Datacycle Architecture for Very High Throughput Database Systems; Proceedings of Association for Computing Machinery Special Interest Group on Management of Data; 1987 Annual Conference, San Francisco, CA, May 27-29, 1987, 9 pages.
Imielinski, T. et al., "Energy-Efficient Indexing on Air", Proceedings of the 1994 ACM SIGMOD, Intl Conference on Management of Data, Minneapolis, Minnesota, May 24-27, 1994, 14 pages.
Imielinski, T. et al., "Mobile Wireless Computing", Communications of the ACM, vol. 37, No. 10, Oct. 1994, 11 pages.
Imielinski, T. et al., "Power Efficient Filtering of Data on Air", Advances in Database Technology—EDBT '94, Proceedings, 4.sup.th Int'l Conference on Extending Database Technology, Cambridge, United Kingdom, Mar. 28-31, 1994, 15 pages.
Ketchpel et al., "Shopping Models: A Flexible Architecture for Information Commerce", Proceedings of the 2.sup.nd ACM Int'l Conference on Digital Libraries, Jul. 25-28, 1997, pp. 65-74, ACM Press, Philadelphia, PA, USA, 11 pages.
Kinghorn et al., "E/Video Cassette Recorder Programming Via Teletext Transmissions", Abstract, 1 page.
Krantz, Keeping an Eye on I/Pro: Media Week, p. 12, 1995. "Marketers Offer Diverging Opinions on Web Measurement" Phillips Media Group's Interactive Marketing News, Oct. 27, 1995, 1 page.
Kristol, et al., "HTTP State Management Mechanism", Bell Laboratories, Lucent Technologies, Feb. 1997, pp. 1-21, Network Working Group, http/www.cis.ohio-state.edu/cgi-bin/rfc-rfc2109.html, 18 pages.
Lumbatis, Kurt, "Menu Object Data Specification", Menu Generation, Starscan, Adaptive Micro-Ware, Inc., pp. 1-17, Appendix A-B, 23 pages.

M-CAM, Inc., Intellectual Property Analysis of Amazon's U.S. Patent No. 5960411, Patently Obvious, Litigation Report, M-Cam.com, Mar. 2, 2001, NE Charlottesville, VA, pp. 1-6.

Menu Header: Description: A Menu Header, Entry.sub.—Count— The number of header entries to follow, Menu Scroll, Description: A menu footer, Info Block, Description: An information block, Adaptive Micro-Ware, Inc., no date available, 1 page.

Menu Object, Description: A Menu Object, An Image Bitmap, Palette.sub.—Colors—Number of colors in Palette, Adaptive Micro-Ware, Inc., no date available, 1 page.

Mukuhira et al., "VPT System for VHS VcCR", Sanyo Electric Co., Ltd., Sanyo Tec Ref. 1990, vol. 22, No. 1, pp. 3-9, Fig. 7, Ref. 5, Abstract, 1 page.

Mulner et al., "Modern Videotax Services and Interactive Telesoftware", Institute for Information Process, Tech. Univ, Gaz, Austria, Videotax International, Proceedings of the Conference pp. 345-351, Online Int. Pinner, 1985, UK., Abstract, 1 page.

Murray et al., "E/Method and Apparatus for Handling Data in Television Signals", Abstract, 1 page.

Nadile, Lisa, "Adobe Targets Mac Web Development", PC Week, v12, n40, p. 62(1), Oct. 9, 1995, 1 page.

Nishizawa et al., Japanese Broadcast Corp., Science and Technology Research Lab, Tokyo Broadcast System, Inc., Matsushitakenkisangyo Eizoonkyojohoken Terbijon Gakkaishi (Journal of the Institute of Television Engineers of Japan), 1994, vol. 48 No. 7, pp. 794-803, Fig. 4, Ref. 56, Journal No. F0330ABG, ISSN No. 0386-6831, Abstract, 1 page.

O'Reilly, Tim, Reilly Awards $10,000 1-Click Bounty to "Three Runners Up", O'Reilly Network, Patents Devcenter, Mar. 14, 2001, pp. 1-5, http//oreillynet.com/lpt/a/675, 3 pages.

Ohtsuki et al., "Experimental Receiving System for TV-Multiplexed Data Broadcasting", R&D Lab., NEC Home Electron, Ltd., Tokyo, Japan, NEC Technical Journal, Apr. 1989, vol. 42, No. 5, pp. 10-15, Abstract, 1 page.

Order on Claim Construction, Nov. 30, 2001, *Amazon.Com, Inc.* v. *Barnesandnoble.Com, Inc. and Barnesandnoble.com, LLC*, No. C99-1695P, filed Nov. 22, 1999, United States District court, Western District of Washington in Seattle, 17 pages.

Pitkow et al.; "Towards an Intelligent Publishing Environment", Computer Networks and ISDN Systems; Amsterdam; Apr. 1995, Abstract, 1 page.

Pongratz, Hanns Joerg, "Computer Graphics in Videotex", Technischen Univ. Grax, Inst. Fuer Informationsvarbeltung, Grax, Austria, Angewandte Informatik, Applied Informatics v. 27, n. 6, Jun. 1985, pp. 232-238, Abstract, 1 page.

Poole et al., "Cable TV Plugs Into Internet", Unix World, Nov. 1993, p. 16, vol. X, No. 11, 1 page.

Pullen et al., "E/Data Transmission in Active Picture Period", no date given, abstract, 1 page.

Reilly, Mark L. Memorandum, "Fractional Channel Frame Formats", Adaptive Micro-Ware,. Inc., Technology Department, Oct. 2, 1991, 1 page.

Reilly, Mark L, "Comm Frame Specification", Starscan Data Delivery Interface, Northwest Starscan, Adaptive Micro-Ware, Inc., pp. 1-14, Printed Nov. 21, 2002, 19 pages.

Reilly, Mark L., "Specification", Data Object Delivery Interface, Northwest Starscan, Adaptive Micro-Ware, Inc., Printed Nov. 21, 2002, pp. 1-8, 11 pages.

Reilly, Mark L., Critical Issues Update, Issue Heading: Comm Frame Spec., Adaptive Micro-Ware, Inc., Oct. 28, 1991, 1 page.

Reissue File History for U.S. Appl. No. 5819034, issued Oct. 6, 1998 to Kurlacose Joseph et al., assigned to Thomson Consumer Electronics, Inc.

Representative ITV Services, (Interactive Television) (Is ITV Here to Stay?), Byte, v18, n2, p. 141(1), Feb. 1993, Abstract, 1 page.

Rice, Dale, "Centralization, Standardization are "Way to Go"", American Banker, Mar. 9, 1987, vol. 152, No. 46, p. 11, 3 pages.

Richards et al., "The Interactive Island—Singapore's Teleview System", IEEE Review, vol. 37, No. 7, pp. 259-263, Jul. 18, 1991, Abstract, 1 page.

Satellite Broadcasting and Communications Association; SSBCA Satellite Industry Key, http://www.scba.com/ket.sub.—data.html; LBRT167553-LBRT167567, Copyright 19982002, pp. 1-15.

Smithson et al., "The Development of an Operational Computer Based Satellite Data Broadcasting System", Plymouth University, UK, Tenth International Conference on Digital Satellite Communications (Con. Publ. No. 403) Part vol. 2, pp. 405-412, IEEE, London, UK, 1994, Abstract, 1 page.

Snell, Jason, "Webtop Publishing Here at Last", MacUser, vl 1, n12, p. 44(2), Dec. 1995, 1 page.

Stallard, "Data Broadcasting", Independent Broadcasting Authority, London, England, IBA Technical Review (Independent Broadcasting Authority) n. 24, Nov. 1988, pp. 48-49, Abstract, 1 page.

Stallings, "Consultative Committee on International Telegraphy and Telephony", Telecommunications, v. 24, n. 3, p. 29(5), Mar. 1990, Abstract, 1 page.

Startrek.Com The Office Star Trek Web Site!, http://www.startrek.com/ p. 1, no date given, 2 pages.

Stow, R.G., "Receiving Conditional Access Teletext", Phillips Consumer Electron., Croydon, UK, IEEE Colloquium on Encryption for Cable and DBS, Digest No. 24, p. 5/1-4, London, UK, 1986, Abstract, 1 page.

Strictly Exchange Online Auction Software, AllCruiseAuction.cotn, pp. 1-3, 1999-2002, http://www.auctionhosting.com.

Swift, Tammy, The Everchanging Marketplace: From the Neighborhood Grocery to the Hyperstores of Today, the Forum, http://www.in-forum.com/specials/century/jan3/week34.html, Aug. 18, 1999, pp. 1-7.

Tanabe et al., "E/Sync Apparatus for Image Multiplex Transmission System", Abstract, 1 page.

Temesi et al., "Telesoftware—The Simple Way", Inst. Of Telecomm. Electron., Budapest Tech. Univer., Hungary, North-Holland, Amsterdam, Netherlands, 1988, Abstract, 1 page.

U.S. District Court Civil Docket, *Amazon.com, Inc.* v. *Barnesandnoble.com, Inc. and Barnesandnoble.com, LLC*, No. C99-1695P, filed Nov. 22, 1999, United States District court, Western District of Washington in Seattle, 27 pages.

Van Den Boom, Henrie, "Interactive Videotex System for Two-Way CATV Networks", Eindovhen University of Technology, Eindoven, Neth. AEU, Archiv Fue Elektronik & Uebertragungstechnik: Elect. & Com. V40, n6, Nov.-Dec. 1986, Abstract, 1 page.

Whitaker et al, "E/Quinews-Electronic Replacement for the Newspaper: System for Distrubting News", Abstract, no date given, 1 page.

Wilcox, Andrew, "MiniVend—Multi-Catalog Shopping Cart and Mall", Describes Mini Vend 2.03, Version 0.2, with portions of Vend 0.3., No date given, web page, http://bill.minivend.com/2simp/minivencl.html, 91 pages.

Wingfield, Nick, "WebTrends Windows 3.1 application will chart World Wide Web site statistics", InfoWorld; Framingham; Abstract, Jan. 8, 1996, 2 pages.

Wong, J.W., "Broadcast Delivery", Proceedings of IEEE, vol. 76, No. 12, Dec. 1988, 12 pages.

Woolnough, Roger, "Teleview Puts Datacom On Screen—Hybrid Videotex Melds Phone, TV", Electronic Engineering Times, 1988, N 449,49, Abstract, Aug. 15, 1988, 1 page.

www.satbiznews.com, "A Look Back at 1991", http://www.sabiznews.com/91 look.html, LBRT167548-LBRT167552, 1991, 5 pages.

Yamada, Ken, "Hewlett Devises Way for Palm-op PCT to be linked to "Interactive" Television", Wall Street Journal, Oct. 7, 1992, 3 pages.

Yang et al., "Proposed Home Information System in Taiwan: Videoinfo System", Industrial Technology Research Inst., Hsinchu, Taiwan, Chicago, IL., Digests of Technical Papers—IEEE International Conference on Consumer Electronics, 1994, IEEE, Pisataway, NJ, 94CH3363-9, abstract, 1 page.

Yee et al., "E/Digital Data Capture for Use with Tv Set or Monitor", Abstract, No date given, 1 page.

Yee et al., E/TV Data Capture Device, Abstract, 3035058, No date given, 1 page.

Yee et al., E/TV Data Capture Device, Abstract, No date given, 3284226, 1 page.

Zachary, G. Pascal, Technology: HP is Building Gadget to Make TVs Interactive, Wall Street Journal, Feb. 27, 1992, 4 pages.

Zdonik, S., "Are "Disks in the Air" Just Pie in the Sky?", IEEE, Workshop on Mobile Computing Systems and Applications, Santa Cruz, CA, Dec. 1994, 8 pages.

Office action mailed Jun. 2, 2003, for related U.S. Appl. No. 09/970,772, 37 pages.
Amendment filed Nov. 3, 2003, for related U.S. Appl. No. 09/970,772, 153 pages.
Notice of non-Compliant Amendment, mailed Nov. 25, 2003, for related U.S. Appl. No. 09/970,772, 2 pages.
Response to Notice of Non-Compliant filed Dec. 2, 2003, for related U.S. Appl. No. 09/970,772, 2 pages.
Office action mailed Mar. 15, 2004, for related U.S. Appl. No. 09/970,772, 32 pages.
Examiners's Interview Summary mailed May 5, 2004, for related U.S. Appl. No. 09/970,772, 2 pages.
Amendment filed May 11, 2004, for related U.S. Appl. No. 09/970,772, 5 pages.
Office action mailed Sep. 22, 2004, for related U.S. Appl. No. 09/970,772, 25 pages.
Amendment filed Oct. 15, 2004, for related U.S. Appl. No. 09/970,772, 41 pages.
Final Office action mailed Jan. 26, 2005, for related U.S. Appl. No. 09/970,772, 32 pages.
Examiner's Interview Summary mailed Apr. 7, 2005, for related U.S. Appl. No. 09/970,772, 3 pages.
Request for Continued Examination filed Apr. 20, 2005, for related U.S. Appl. No. 09/970,772, 3 pages.
Office action mailed Jun. 1, 2006, for related U.S. Appl. No. 09/970,772, 3 pages.
Amendment After Final filed Dec. 1, 2006, for related U.S. Appl. No. 09/970,772, 22 pages.
Amendment filed Mar. 5, 2007, for related U.S. Appl. No. 09/970,772, 19 pages.
Supplemental Amendment filed Mar. 6, 2007, for related U.S. Appl. No. 09/970,772, 19 pages.
Office action mailed Mar. 22, 2007, for related U.S. Appl. No. 09/970,772, 36 pages.
interview Summary mailed Apr. 19, 2007, for related U.S. Appl. No. 09/970,772, 4 pages.
Response filed Aug. 22, 2007, for related U.S. Appl. No. 09/970,772, 26 pages.
Final Office Action mailed Oct. 30, 2007 for related U.S. Appl. No. 09/970,772, 6 pages.
Petition Under 37 CFR .sctn. 1.181 filed Jan. 30, 2008 for related U.S. Appl. No. 09/970,772, 7 pages.
Decision on Petition to Withdraw Final Office Action Under 37 CFR .sctn. 1.181 mailed Aug. 26, 2008 for related U.S. Appl. No. 09/970,772, 4 pages.
Office action mailed Sep. 16, 2008 for related U.S. Appl. No. 09/970,772, 39 pages.
Response filed Feb. 17, 2009 for related U.S. Appl. No. 09/970,772, 38 pages.
Broadening Reissue Amendment mailed Jan. 30, 2008 in related U.S. Appl. No. 12/022,956, 25 pages.
Office action mailed May 11, 2009 in related U.S. Appl. No. 12/022,956, 5 pages.
Mauer, Douglas, "BizNet Technologies Announces Release of Versatile Virtual Vending", PR Newswire, Sec. 1, Sep. 13, 1994, 3 pages.
Forcht, Karen, "Security Issues and Concerns with the Internet", Internet Research, vol. 5, issue 3, 1995, 8 pages.
Response filed Feb. 17, 2009 for related U.S. Appl. No. 09/970,772, 38 pages.
Final Office action mailed May 29, 2009 for related U.S. Appl. No. 09/970,772, 37 pages.
Interview Summary mailed Aug. 27, 2009 for related U.S. Appl. No. 09/970,772, 4 pages.
Response filed Aug. 31, 2009 for related U.S. Appl. No. 09/970,772, 22 pages.
Response filed Sep. 11, 2009 in related U.S. Appl. No. 12/022,956, 5 pages.
Advisory action mailed Sep. 4, 2009 for U.S. Appl. No. 09/970,772, 3 pages.
Request for Continued Examination filed Sep. 28, 2009 for U.S. Appl. No. 09/970,772, 27 pages.

* cited by examiner

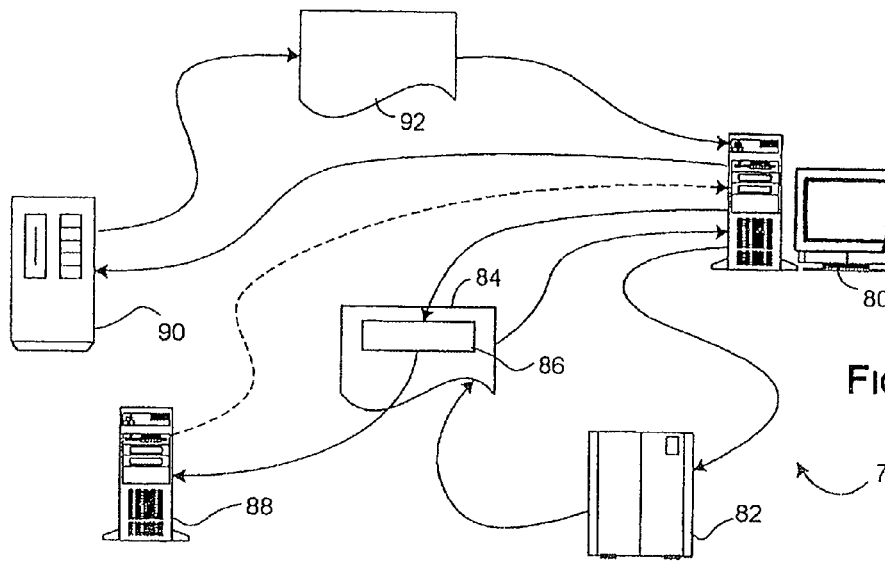
FIG. 5
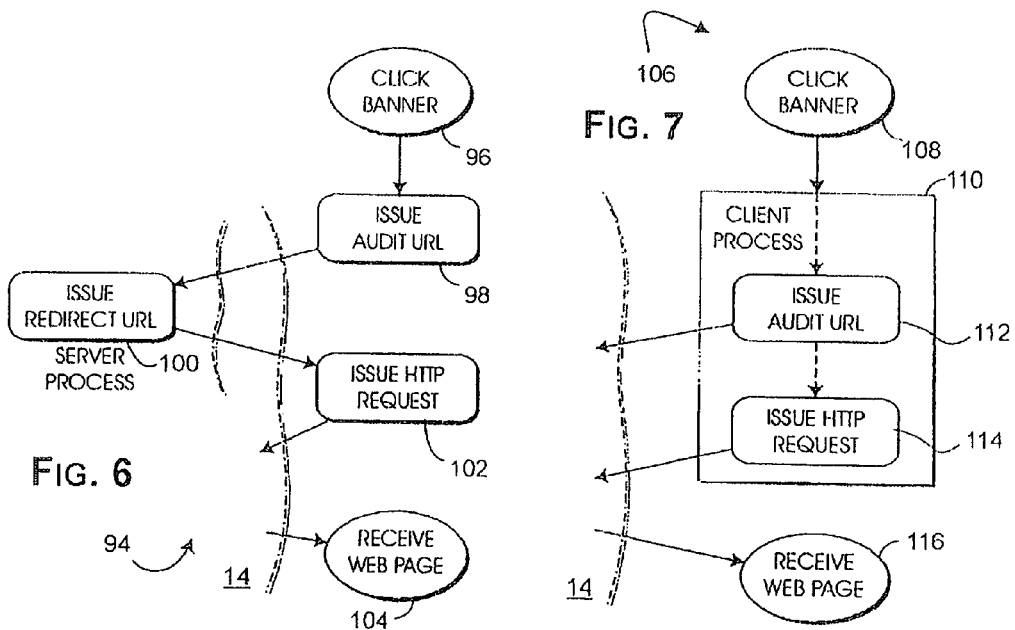
FIG. 6
FIG. 7

METHOD AND APPARATUS FOR REDIRECTION OF SERVER EXTERNAL HYPER-LINK REFERENCES

This application is a Continuation of application Ser. No. 11/031,100, filed on Jan. 6, 2005 now U.S. Pat. No. 7,702,752, which is a Continuation of application Ser. No. 10/190,341, filed on Jul. 3, 2002, now U.S. Pat. No. 6,859,833, which application is a Continuation of application Ser. No. 09/655,999, filed on Jun. 6, 2000, now U.S. Pat. No. 6,466,966, which application is a Continuation of application Ser. No. 09/071,674, filed on May 1, 1998, now U.S. Pat. No. 6,189,030, which is a Continuation-In-Part of application Ser. No. 08/999,727, filed on Dec. 23, 1997, now U.S. Pat. No. 5,870,546, which is a Continuation of application Ser. No. 08/604,468, filed on Feb. 21, 1996, now U.S. Pat. No. 5,751,956, which applications are incorporated herein by reference in their entirety.

BACKGROUND OF THE INVENTION

1. Field of the Invention

The present invention is generally related to the control of network information server systems supporting World Wide Web based data pages and, in particular, to a server system and process for efficiently redirecting external server hyper-link references for purposes of controlling, moderating, and accounting for such references.

2. Description of the Related Art

The recent substantial growth and use of the internationally connected network generally known as the Internet has largely been due to widespread support of the hypertext transfer protocol (HTTP). This protocol permits client systems connected through Internet Service Providers (ISPs) to access independent and geographically scattered server systems also connected to the Internet. Client side browsers, such as Netscape Mozilla® and Navigator® (Netscape Communications Corp.), Microsoft Internet Explorer® and NCSA Mosaic™, provide efficient graphical user interface based client applications that implement the client side portion of the HTTP protocol.

Server side application programs, generically referred to as HTTPd servers, implement the server side portion of the HTTP protocol. HTTP server applications are available both commercially, from companies such as Netscape, and as copyrighted freeware available in source code form from NCSA.

The distributed system of communication and information transfer made possible by the HTTP protocol is commonly known as the World Wide Web (WWW or W3) or as simply "the Web." From a client side user interface perspective, a system of uniform resource locators (URLs) is used to direct the operation of a web browser in establishing atomic transactional communication sessions with designated web server computer systems. In general, each URL is of the basic form:

http://<server_name>.<sub-domain.top_level-domain>/<path>

The server_name is typically "www" and the sub_domain.top-level_domain is a standard Internet domain reference. The path is an optional additional URL qualifier.

Specification by user selection of a URL on the client side results in a transaction being established in which the client sends the server an HTTP message referencing a default or explicitly named data file constructed in accordance with the hypertext mark up language (HTML). This data file or web page is returned in one or more response phase HTTP messages by the server, generally for display by the client browser. Additional embedded image references may be identified in the returned web page resulting in the client browser initiating subsequent HTML transactions to retrieve typically embedded graphics files. A fully reconstructed web page image is then presented by the browser through the browser's graphical user interface.

Due to the completely distributed client/server architecture of the Web, as made possible by the URL system further supported by the existing Internet name resolution services and routing conventions, HTTP servers can be independently established with little difficulty. Consequently, the Web has no centrally or even regionally enforced organization other than loosely by name of the top level domain. Searching for information or other resources provided by individual HTTP servers is therefore problematic almost by definition. Because of the time, cost and complexity of assembling comprehensive, yet efficiently searchable databases of web information and resources, commercial Internet Business Services (IBS) have been established to provide typically fee based or advertising revenue supported search engine services that operate against compilations of the information and resources available via the Web correlated to source URLs. Access to such search engines is usually provided through server local web pages served by the Internet Business Services. The results of a search are served in the form of local web pages with appropriate embedded remote or hyper-linked URLs dynamically constructed by the server of the Internet Business Service.

Because of the opportunity presented by the likely repeated client access and retrieval of search engine and search result web pages, providers of other Internet based services have begun to actively place advertisements on these web pages. As is typical in advertising mediums, the frequency of display of an advertisement generally defines the compensation paid to the advertisement publisher. Thus, the number of times that an advertisement is simply transferred to a client browser provides an indication of how effectively the advertisement is being published. A more direct measure of the effectiveness of a particular advertisement on a particular web page is the number of times a client web browser chooses to actively pursue the URL represented by the advertisement. Thus, there is a need to be able to track information obtainable from a client browser when a hyper-linked advertiser's URL is selected.

The difficulty in obtaining direct reference information arises from the fact that a web page with an embedded advertisement and corresponding remote URL is served in its entirety to the client browser upon first reference to the web page. The selection of a particular advertiser's URL is then by definition performed through an independent transaction directed to the HTTPd server associated with the advertiser. Since the advertiser publishing HTTPd server is not pert of this subsequent transaction, the publishing server is conventionally incapable of tracking client browser hyper-links actually executed to an advertiser's URL or any other URLs embedded in a web page previously served to the client browser.

Simple web page access counters are relatively well known and used throughout the Web. These access counters are based on a common gateway interface (CGI) facility supported by modern HTTPd server systems. The CGI facility permits generally small programs, at least typically in terms of function, to be executed by a server in response to a client URL request. That is, the HTML web page definition provides for the embedding of a specific HTML reference that will specify execution of a server side CGI program as part of the process of the web browser reconstructing an image of a served web page. Such a HTML reference is typically of the form:

<img src="http://www.target.com/cgi-bin/count.cgi">

Thus, a counter value incremented with each discrete execution of the CGI program (count.cgi) dynamically provides part of the displayable image of the reconstructed web page. The time, remote client requester, client domain, client browser type and other information that may be known through the operation of the HTTP protocol may be logged as part of the CGI program's function. Consequently, a reasonable manner of accounting and auditing for certain web page accesses exists.

Access counters, however, fundamentally log only server local web page accesses. The client browser to the CGI program is evaluated by the client in connection with the initial serving of the web page to the client browser. The initial serving of the web page to the client browser can be connected, but any subsequent selection of a URL that provides a hyper-link reference to an external server is not observed and therefore is not counted by a CGI program based access counter. Other limitations of access counters arise from the fact that the implementing CGI program is an independently loadable executable. The CGI program must be discretely loaded and executed by the server computer system in response to each URL reference to the CGI program. The repeated program loading and execution overhead though potentially small for each individual invocation of the CGI program, can represent a significant if not substantial load to the sever computer system. The frequent execution of CGI programs is commonly associated with a degradation of the effective average access time of the HTTPd server in responding to client URL requests. Since an Internet Business Service providing access to a search engine logs millions of requests each day, even small reductions in the efficiency of serving web pages can seriously degrade the cost efficiency of the Internet Business Service. As of December, 1995, Infoseek Corporation, in particular, handles an average of five million retrievals a day.

The execution overhead associated with CGI programs is often rather significant. Many CGI programs are implemented at least in part through the use of an interpreted language such as Perl or TCL. Consequently, a substantial processing overhead is involved in multiple mass storage transfers to load both the interpreter and CGI program scripts, to process the scripts through the execution of the interpreter, and then actually log whatever useful data is generated, typically to persistent mass storage. Finally, the interpreter and/or CGI program may have to be unloaded.

In addition, external CGI programs present a significant problem in terms of maintenance, including initial and ongoing server configuration and control, and security in the context of a busy server system. Individual CGI programs will likely be needed for each independent web page in order to separately identify web page service counts. Alternatively, a CGI program can be made sufficiently complex to be able to distinguish the precise manner in which the program is called so as to identify a particular web page and log an appropriately distinctive access count. Maintenance of such CGI programs on a server system where large numbers of page accesses are being separately counted is non trivial.

Further, the existence of external programs, particularly of scripts that are interpreted dynamically, represents a potential security problem. In particular, the access and execute permissions of interpreted scripts must be carefully managed and monitored to prevent any unauthorized script from being executed that could, in turn, compromise the integrity of the data being collected if not the fundamental integrity of the server computer system itself. Consequently, known access counters provide no solution directly in full or in part to the need to account or audit URL references to external servers based on hyper-links from previously served web pages.

The HTTP protocol itself provides for a basic server based system of URL redirection for servers and clients supporting the 1.5 or later versions of the HTTP protocol. A configuration file associated with an HTTP server (typically srm.conf) can specify a redirect directive that effectively maps a server local directory URL reference to an external URL reference through the use of a configuration directive of the form:

Redirect /dir1 http://newserver.widget.com/dir1

When a Version 1.5 or later HTTP server receives a URL reference to a local directory (/dir1) that is specified as above for redirection, a redirect message is returned to the client browser including a new location in the form of an URL (http://newserver.widget.com/dir1). This redirect URL is then used by the client browser as the basis for a conventional client URL request.

This existing server based redirection function is insufficient to support external server access tracking since, in its usual form, the redirection is of the entire directory hierarchy that shares a common redirected base directory. Even in the most restricted form, the redirection is performed on a per directory reference basis. Thus, every access to the directory, independent of the particular web page or graphics image or CGI program that is the specific object of an access request is nonetheless discretely redirected without distinction. Any potential use of the existing server redirect function is therefore exceedingly constrained if not practically prohibited by the HTTP protocol defined operation of the redirect directive.

Furthermore, the redirect directive capability of the HTTP protocol server does not provide for the execution of a CGI program or other executable coincident with the performance of the redirection thereby essentially precluding any action to capture information related to the redirect URL request. In addition, the complexity of the resource configuration file necessary to specify redirection down to a per directory configuration again raises significant configuration, maintenance and, to a lesser degree, security issues. Thus, server redirection does not possess even the basic capabilities necessary to support external URL hyper-link reference auditing or accounting.

Finally, a form of redirection might be accomplished though the utilization of a relatively complex CGI program. Such a redirection CGI program would likely need to perform some form of alternate resource identification as necessary to identify a redirection target URL. Assuming that a unique target URL can be identified, a redirection message can then be returned to a client from the CGI program through the HTTP server as necessary to provide a redirection URL to the client browser.

Unfortunately, any such CGI program would embody all of the disadvantages associated with even the simplest access counter programs. Not only would problems of execution load and latency, as well as configuration, maintenance and security remain, but such an approach to providing redirection is inherently vulnerable to access spoofing. Access spoofing is a problem particular to CGI programs arising from the fact that the HTML reference to the CGI program may be issued without relation to any particular web page. Consequently, any CGI program implementing an access counter or other auditing or accounting data collecting program can produce an artificially inflated access count from repeated reference to the CGI program HTML statement outside and independent of a proper web page. Access spoofing inherently undermines the apparent if not actual integrity of any data gathered by a CGI program. Since, at minimum, the ability to insure the accuracy of even a simple access count would be of fundamental importance to an Internet service advertiser, the use of CGI programs to provide even basic accounting or auditing functions is of limited practical use. Finally, HTML does not provide a tamper-proof way for two URLs to be accessed in sequence with just one URL reference button, such as, for example, a server CGI counter URL reference followed by external server URL reference.

SUMMARY OF THE INVENTION

Thus, a general purpose of the present invention is to provide a system and method of reliably tracking and redirecting hyper-link references to external server systems.

This is achieved by the present invention through the provision of a message to a tracking server system in response to a client system referencing a predetermined resource locator that corresponds to a resource external to the tracking server system. The tracking server system indirectly provides for the client system to have an informational element selectable by the client system, where the informational element is graphically identified on the client system with informational content obtainable from a content server system through use of a content resource locator. The informational element includes a tracking resource locator, referencing the tracking server system, and data identifying the informational element. The selection of the informational element causes the client system to use the tracking resource locator to provide the data to the tracking server system and to use the content resource locator to obtain the informational content from the content server system.

Thus, an advantage of the present invention is that URL reference data is captured in an expedient manner that interposes a minimum latency in returning the ultimately referenced web page while imposing minimum visibility of the redirection protocol on client users.

Another advantage of the present invention is that independent invocations of server external support programs and multiple external data references are not required as a consequence of the present invention, thereby minimizing the CPU and disk intensive load on the web server computer system and the resulting latency.

A further advantage of the present invention is that the reference identifier and a redirection directive can both be maintained wholly within the URL specification discretely provided by a client HTML request. Thus, the present invention is superior in both efficiency and maintenance requirements to a CGI counter, or any method that incorporates a CGI counter.

Still another advantage of the present invention is that program modifications necessary to support the protocol of the present invention are implemented entirely at the server end of a protocol transaction. Client side participation in the transaction is within the existing client side defined HTML protocol.

A still further advantage of the present invention is that the implementation of the invention introduces minimum exposure to additional security breaches due to the closed form of the protocol while providing substantial security against inappropriate URL and protocol references. This is accomplished preferably by the inclusion of validation codes inside the URL specification.

BRIEF DESCRIPTION OF THE DRAWINGS

These and other advantages and features of the present invention will become better understood upon consideration of the following detailed description of the invention when considered in connection with the accompanying drawings, in which like reference numerals designate like parts throughout the figures thereof, and wherein:

FIG. 5 provides a generalized process representation of client and server computer systems implementing the alternate processes of the present invention;

FIG. 6 is a flow diagram illustrating a server-side process that provides for the issuance of a content request message in accordance with a preferred embodiment of the present invention; and FIG. 7 is a flow diagram illustrating a client-side process that provides for the issuance of a tracking message in accordance with a preferred embodiment of the present invention.

DETAILED DESCRIPTION OF THE INVENTION

Figure 1:
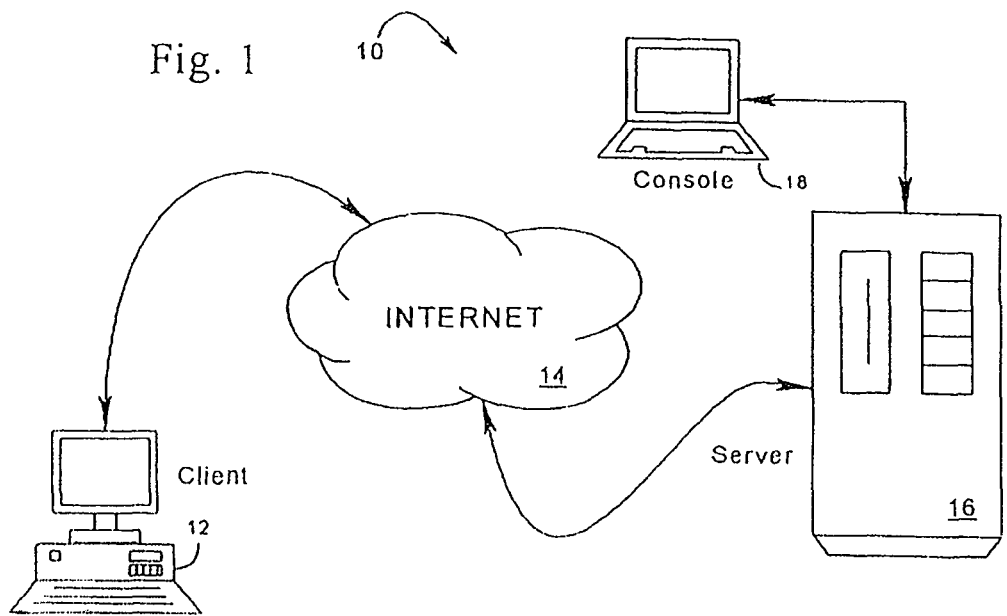
FIG. 1 provides a schematic representation of client and server computer systems inter-networked through the Internet.

A typical environment 10 utilizing the Internet for network services is shown in FIG. 1. Client computer system 12 is coupled directly or through an Internet service provider (ISP) to the Internet 14. By logical reference via a uniform resource locator, a corresponding Internet server system 16, 18 may be accessed. A generally closed hypertext transfer protocol transaction is conducted between a client browser application executing on the client system 12 and an HTTPd server application executing on the server system 16. In a preferred embodiment of the present invention, the server system 16 represents an Internet Business Service (IBS) that supports or serves web pages that embed hyper-link references to other HTTPd server systems coupled to the Internet 14 and that are at least logically external to the server system 16.

Within this general framework, the present invention enables the tracking of the selection of embedded hyper-link references by client system 12. That is, an embedded hyper-link reference is associated with a graphical banner or other Web page element that is selectable, or clickable, by a user of the client system 12. A banner click on a client system is typically made to obtain information, identified in some fashion by the banner graphic that is of interest to the client system user. Tracking is preferably enabled by embedding HTML information in the Web page served to the client system 12. This information is served from any prearranged HTTPd server system to the client system 12. The prearrangement is with an IBS to track banner clicks, on Web pages served by or on behalf of a designated tracking HTTPd server system, such as system 16, that operates to collect the served page provided tracking information.

The embedded information is, in accord with the present invention, sufficient to enable the client computer system 12 to provide tracking information to the HTTPd server system 16. As will be seen, this information is also sufficient, directly or indirectly, to enable the client computer to request the information associated with the banner graphic. As will also be seen, there are a number of possible implementations of the present invention. These implementations can generally be categorized as predominately using either a server-side or client-side process, as involving proprietary, plug-in, and interpreted control processes, and as using any of a number of specific data transfer protocols.

The preferred embodiment of the present invention utilizes a server-side process implemented as a proprietary modification to the HTTPd server application executed by the server system 16 and that uses the HTTP redirection directive. Thus, a web page served by an HTTPd server system, such as the server system 16 or another server system (not shown) to the client 12 embeds a URL reference to a web page served by the logically external server system. Selection of this embedded URL through the client browser of the client computer system 12 results initially in an HTTP transaction with the server system 16 rather than the external server. The information stored in the embedded URL first served with the web page to client system 12 is thus provided back to the server system 16 upon selection of the URL even though the apparent target of the URL is the external server system. A redirection response is then provided by the server system 16 to the client system 12 providing the corresponding redirection URL.

Figure 2:
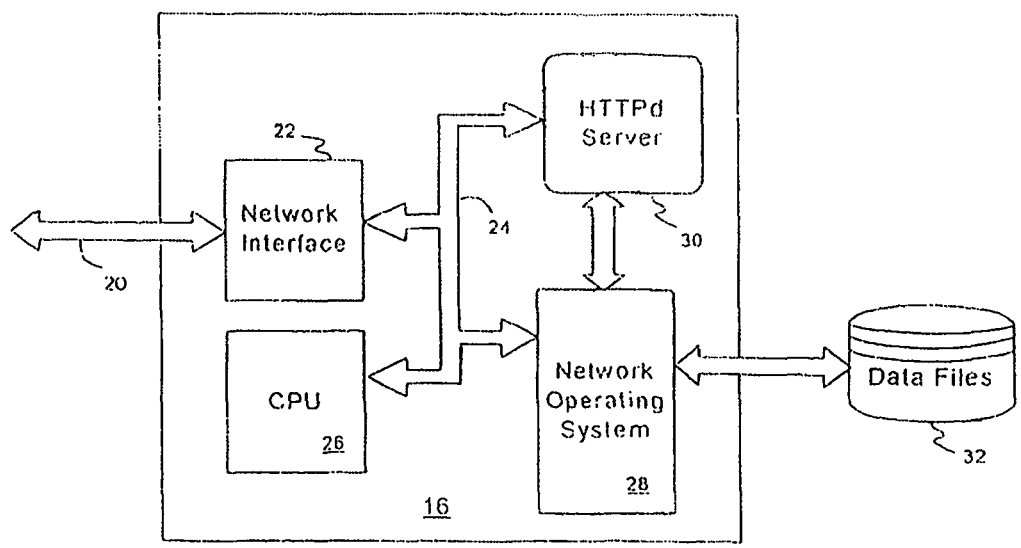
FIG. 2 provides a block diagram of a server computer system implementing an HTTP daemon (HTTPd) server in accordance with a preferred embodiment of the present invention.

As shown in FIG. 2, the server system 16 receives the redirection request information via a network connection 20 to a network interface 22 within the server system 16. The network interface 22 is coupled through an internal bus 24 to a central processing unit (CPU) 26. The CPU 26 executes a network operating system 28 in support of the network interface 22 and other functional aspects of the server system 16. The network operating system 28 supports the execution by the CPU 26 of an HTTPd server application 30 that defines the responsive operation of the server system 16 to HTTP requests received via the network 20. Finally, the network operating system 28 provides for temporary and persistent storage of data in a mass storage device 32 preferably including a persistent storage media such as provided by a conventional hard disk drive.

In accordance with the preferred embodiment of the present invention, the embedded redirection information provided as part of a URL HTTP request is processed by the HTTPd server 30. Preferably, the processing by the HTTPd server 30 is performed through the execution of the server 30 itself as opposed to the execution of any external CGI programs or the like. The redirection information is processed by the execution of the server 30 to identify and validate the particular URL reference that provided the redirection information and to generate a redirection target URL.

In a preferred embodiment of the present invention, an embedded URL containing redirection information is formatted as follows:

http://<direct_server>/redirect?<data>?http://<redirect_server>

The direct_server portion of the embedded URL specifies the HTTP server target of a transaction that is to be initially established by the client system 12. The remaining information is provided to the tracking or targeted direct server. The direct server may be any HTTPd server accessible by the client system 12 that has been designated to service redirection requests in accordance with the present invention.

The term "redirect" in the embedded redirection URL is a key word that is pre-identified to the HTTPd server 30 to specify that the URL corresponds to a redirection request in accordance with the present invention. Although the term "redirect" is the preferred term, any term or code may be selected provided that the term can be uniquely identified by the HTTPd server 30 to designate a redirection URL. The recognition processing of the "redirect" term is preferably performed through the execution of the server 30 by way of a corresponding modification to the HTTPd server application. That is, the HTTPd server application is modified to recognize the term "redirect" as a key word and to execute a subprogram to implement the server-side process of this preferred embodiment. Alternately, the modification to the HTTPd server application can be implemented as a "plug-in" binary program operative through a conventional interface provided with the HTTPd server application to obtain essentially the same functionality. Although of possibly lesser performance, a server application embedded language, such as Java® or JavaScript®, may be also alternately used to implement the server-side process of recognizing the "redirect" key word and performing the further processing to implement the present invention.

The "data" term of the redirection URL provides reference identifier data to the HTTPd server 30 that can be used to further identify and potentially validate a redirection URL to the HTTPd server 30. The data thus permits an accounting of the redirection URL to be made by the HTTPd server 30. In the context of an advertisement, the data may encode a particular advertising client for whom access data may be kept, a particular instance of the graphic image provided to a client system 12 in association with the redirection URL, and potentially a validation code that may serve to ensure that inappropriate client uses of a redirection URL can be distinguished and discarded by the HTTPd server 30.

An exemplary redirection URL, constructed using HTML in accordance with a preferred embodiment of the present invention, is as follows:

< a href = "http://www.infoseek.com/IS/redirect?NwPg-003-AA?http://www.newspage.com" >

Within the redirection data, the data component "NwPg" serves as a client or account identifier. The data component "003" is a series identifier indicating a particular graphic image that was associated with the redirection URL as embedded in the web page served to the client system 12. Finally, the data component "AA" may be utilized to provide a basic validation identifier that serves to permit the HTTPd server 30 to identify inappropriate repeated submissions of the redirection URL to the server system 16 or those that are determined to be obsolete by convention.

In an alternate embodiment of the present invention, the validation data encodes a data representation that can be used in conjunction with the HTTP protocol to provide information regarding the client system 12 that submitted the redirection URL and, optionally, the graphics series identifier data, to limit repeated use of the redirection URL by the same client system 12 within a defined short period of time. Thus, an inappropriate attempt by a third party client to, in effect, tamper with the data collected by the server system 16 with respect to any particular redirection URL can be identified with relative if not complete certainty and blocked. In addition, date codes older than a certain time interval can be declared by computation to be invalid. Consequently, a copy of the embedded redirection URL cannot be stored on a client system 12 and remain viable for use for longer than a period of time defined exclusively by the server computer system 16.

Each of the data terms within a redirection URL may be statically or dynamically created by the HTTPd server 30 as part of the process of originally serving a web page with the embedded redirection URL to a client computer system 12. With dynamic generation, different graphic images corresponding to a single advertiser or one of any number of advertisers may be effectively served with an otherwise statically defined web page. The data terms of the embedded redirection URL may be dynamically selected based on the identity of the advertiser and graphics image in addition to separately establishing hypertext link to the graphics image as part of an instance of serving a particular web page by the HTTPd server 30. Indeed, the selection of advertiser and graphics image could be made at least in part on the identity of the client computer system 12 as established through information provided by the conventional operation of the HTTP protocol, and on the client profile if known.

The validation code may also be dynamically generated. In an alternate embodiment of the present invention, the validation code encodes a representation of the day of the year with the account and image identifier data terms to generate an identifier, preferably encoded as two digits, that provides a sufficient degree of uniqueness to allow an embedded redirection URL to be aged on a per day basis. Furthermore, the validation code remains constant on a per day basis and thereby still permits the number of references on a per day per specific client system 12 basis to be tracked by the HTTPd server 30 so as to limit the frequency that a specific instantiation of the web page is repeatedly presented to a specific client 12. Additionally, the HTTPd server 30 may operate to block operation on a received redirection URL where the corresponding web page has not recently been served to the requesting client 12.

Various bit shift, check sum, and modulo arithmetic algorithms can be utilized to generate the validation code in a consistent manner known to the HTTPd server 30, but that cannot be readily discerned upon examination of the resulting redirection URL by a specific client computer system 12. Alternately, the validation code may be an arbitrarily selected value that is implicitly recognized as valid by the HTTPd server 30 for a programmable period of time from one day to several weeks or longer. In the extreme, and consistent with the initially preferred embodiment of the present invention, the validation code is a static value provided as part of the embedded redirection URL.

Independent of the particular manner the validation code is generated or the assigned length of time that the code is recognized by the HTTPd server 30 as valid, evaluation of the data terms of a redirection URL is preferably performed completely internally to the HTTPd server 30. The data terms are preferably sufficiently complete as to be unambiguous in identifying a particular instantiation of an embedded redirection URL without significant, if any, resort to the loading and execution of an external program or even significantly to interrogate look-up files stored by the persistent storage device 32. Consequently, the burden of evaluating a redirection URL in accordance with the present invention is almost completely computational in nature. As is conventionally appreciated, the performance of a server computer system 16 is not typically computationally bound, but rather bound by the rate of input/output (I/O) access to the persistent storage device 32 and to the network 20. By substantially if not completely limiting the evaluation of the redirection URL to a computational operation, with only a limited I/O operation to save auditing or accounting data obtained in connection with a redirection URL, an optimally minimal burden on the server computer system 16 is realized by the operation of the present invention. Indeed, the saving of accounting or auditing data may be cached by the network operating system 28 to defer the write I/O operation to the persistent storage device 32 until otherwise excess I/O bandwidth is available in the ongoing operation of the server computer system 16.

The final portion of the preferred structure of a redirection URL is a second URL. This second URL preferably identifies directly the target server system for the redirection. Preferably, any path portion provided as part of the direct server specification of the redirection URL is repeated as a path component of the redirect server portion of the redirection URL. However, path portion identity is not required. In general, all that is required in accordance with the present invention is a one to one correspondence between the direct server and redirect server terms of the redirection URL. A less strict relationship may be used if the impact upon the auditing or accounting data collected by the operation of the present invention is consistent with the desired characteristic of that data. For example, different direct server specifications may correlate to the use of a common redirect server as a means of further identifying a particular instantiation of an embedded redirection URL. Alternately, otherwise identical instantiations of an embedded redirection URL may reference any of a number of redirect servers. Thus, the embedded redirection URL provides only an indirect reference to the ultimately servicing redirect server and relies on the direct_server identified server system or the redirect servers themselves to resolve the second URL into a direct reference to an ultimately servicing redirect server. This may be done to distribute load on the cooperatively operating redirect servers or to provide a means for verifying the auditing or accounting data collected by the ongoing operation of the present invention. Indeed, the second URL of a redirection URL can itself be a redirection URL, though care needs to be taken not to create an infinite redirection loop.

Figure 3:
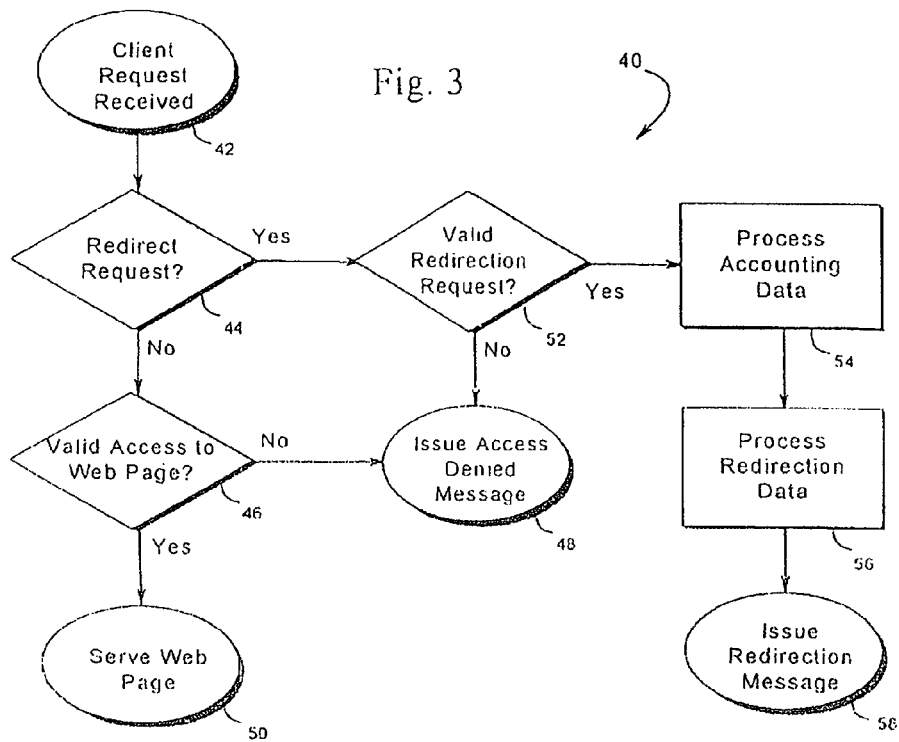
FIG. 3 provides a flow diagram illustrating the process performed by a preferred embodiment of the present invention in receiving and processing client URL requests.

A preferred method 40 of processing redirection URLs provided to a server computer system 16 by a client computer system 12 is illustrated in FIG. 3. As each client request is received 42 the data provided as part of the request is examined to determine whether the request embeds the redirect key word 44. If the URL data does not specify a redirection request consistent with the present invention, the URL data is checked 46 to determine whether the URL data conventionally specifies an existent local web page. If the web page does not exist or, based on the client identification data provided via the HTTP protocol in connection with the URL client request, the particular client is not permitted access to the existent web page, the HTTPd server 30 determines a corresponding error message 48 that is returned to the client computer system 12. Otherwise, the HTTPd server 30 proceeds and serves the local web page 50 to the client computer system 12.

Where URL data at least specifies a redirection request 52, the URL data is further checked for validity. A table of valid combinations of client and graphic image identifiers, preferably cached in memory in the server system 16, may be used to initially establish the validity of the redirection request. The validation code may either be checked by recalculation based on the provided redirection data or checked against another table of validation codes that are current. In either event, the relative timeliness of the redirection request can be determined from the age of the validation code and therefore serve as basis for determining whether the current redirection request is timely or suspect. Furthermore, additional checks may be performed to verify that the corresponding web page has indeed been served recently by the server computer system 16 to the particular requesting client computer system 12 based on a short term log of local web pages actually served by the server computer system 16. Finally, access permissions enforced by the server computer system 16 can be checked against the identification of the client computer system 12 to categorically limit redirection to defined classes of clients.

Where the request is determined to be invalid for any reason, an appropriate denial message is generated and issued 48.

Where a redirection request is determined valid, any or all of the data provided as part of the redirection request or provided to the HTTPd server 30 through the conventional operation of the HTTP protocol can be logged through the network operating system 28 to the persistent storage device 32 for subsequent manipulation, analysis and reporting. The redirection request is then further processed to obtain the second URL identifying the target redirection server 56. This second URL is then specified in the location field of a redirection message, preferably a temporary redirection message, that is issued 58 back to the client computer system 12 that issued the redirection URL initially.

The process 40 in accordance with a preferred embodiment of the present invention, is performed essentially entirely within the HTTPd server 30. The implementation of the process 40 can be performed through a modification and extension of the processing flow implemented by the HTTPd server 30, through a corresponding modification of the server source code. These modifications and additions may be made utilizing conventional programming techniques.

Figure 4:
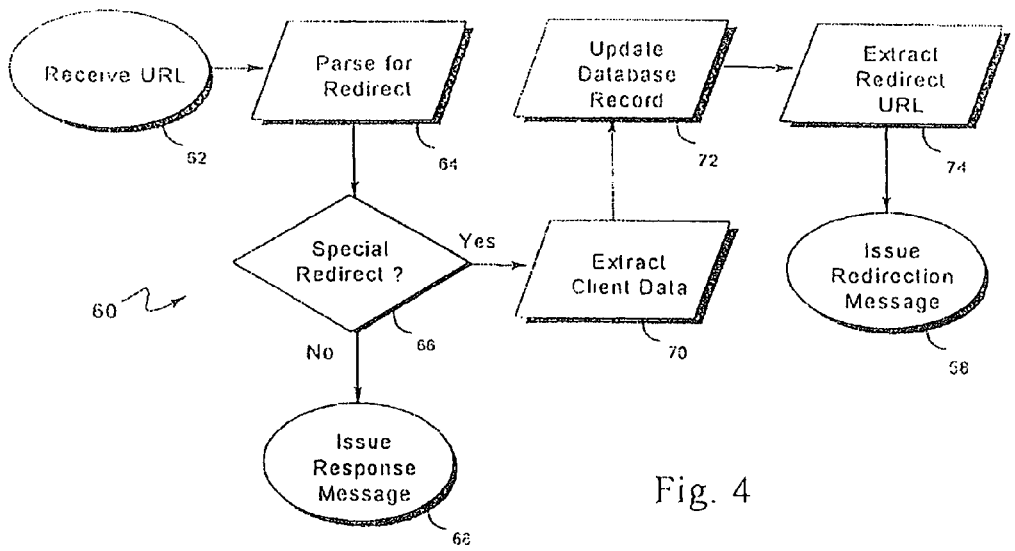
FIG. 4 provides a flow diagram illustrating the server side processing of special redirect URLs in accordance with another preferred embodiment of the present invention.

The redirection capability provided by the present invention is fully consistent with existent de-facto standard redirection capabilities provided by conventional HTTPd servers. A further detailed portion 60 of the process 40 is shown in FIG. 4. Within the operation of the HTTPd server 30, the URL data 62 is received and initially parsed 64 to identify the appropriate existence of the redirect key word. Where the specific form of the redirection URL of the present invention is not identified 66, the URL is further processed in a conventional manner to determine whether any other form of redirection is applicable. In addition, an evaluation of conventional access privileges to a local web page where no conventional redirection is specified can also be performed with, ultimately, an appropriate response message being issued 68.

In the specific instance where the URL request is of the special redirect form consistent with the present invention, as opposed to conventional HTML redirection capabilities, the URL data is processed 70 and, in combination with the HTTP protocol-provided data identifying the client computer system 12, a database record is created or updated in the persistent mass storage device 32 at 72. The second URL is then extracted 74 and a redirection message, specifically a type 302 temporary redirection message, is prepared. As before, the second URL may be a direct or literal URL or an indirect redirection target server identification that is resolvable by the HTTPd server 30 into a URL that is at least sufficient to identify the target redirection server. Since the second URL, as embedded in a Web page, is defined through prearrangement with the operation of the HTTPd server 30, resolution of any indirect redirection target server identification is fully determinable by the HTTPd server 30 through, for example, a database look-up operation.

A redirection message including a location field is then created by the HTTPd server 30. This location field is provided with the direct or resolved target redirection server URL. The redirection message is then issued 58 to the originally requesting client computer system 12.

Other server-side operative embodiments of the present invention can use other specific protocols to transfer the tracking information from the client system 12 to the HTTPd server 30. These other HTTP protocol methods include, for example, GET, FORMS, OPTIONS, HEAD, PUT, DELETE, AND TRACE. Use of these other protocol methods are generally similar, differing in their requirements for specific browser support for the protocol methods and details of their specific HTML markup coding into Web pages.

As an example of the use of these other protocol methods, the HTTP GET method can be implemented by embedding the following HTML code tags in the Web pages served to a client computer system.

```
// HTTP GET
    < a href = "http://www.infoseek.com/redirect?\
        ak = MTCH-2009-1073-GEN&\
        rd = http://www.match.com/" >
    < img src = "http://www.online.com/ads/MTCH1073.gif" >
    </a>
```

This HTML code defines "MTCH1073.gif" as the Web page banner graphic, "www.infoseek.com" as the direct_URL, "MTCH-2009-1073-GEN" as the data, and "www.match.com" as the target redirection server.

When the above HTML tags are served to the client computer system, an initial HTTP GET request is issued to "www.online.com" to obtain the banner graphic. In response to a banner click, a second GET request is directed to "www.infoseek.com" using the URL:

/redirect?ak=MTCH-2009-1073-GEN&rd=http://www.match.com/

The complete GET request will be of the form:

```
GET /redirect?ak = MTCH-2009-1073-GEN&\
    rd = http://www.match.com/ HTTP/1.0
User-Agent: Mozilla/3.0
Accept: image/gif, image/jpeg, */*
```

The HTTPd server 30 records the values of MIME information (such as cookies) and the form variables (in this case ak and rd). An HTTP redirect message is then created by the HTTPd server 30 and returned to the client computer system. A third and final GET request is then issued to "www.match.com" in response to the redirection message.

As another example, an HTTP POST method can be used. The Web page embedded HTML tags can be coded as follows:

```
// HTTP POST
    < FORM method = "POST" \
        action = "http://www.infoseek.com/redirect" >
        < INPUT TYPE = hidden \
            NAME = "ak" \
            VALUE = "MTCH-2009-1073-GEN" >
        < INPUT TYPE = hidden \
            NAME = "rd"\
            VALUE = "http://www.match.com/" >
        < INPUT TYPE = image\
            SRC = "http://www.online.com/ads/MTCH1073.gif" >
    </FORM >
```

This HTML code will result in a GET request being issued automatically to "www.online.com" to retrieve the banner graphic. A banner click will result in a HTTP POST request being sent to "www.infoseek.com" along with the FORM NAME and VALUE data. In this case, the data is not encoded into the URL, but rather is encoded in the body of the POST request itself. In this example, the POST request will have the form:

```
POST /redirect HTTP/1.0
User-Agent: Mozilla/3.0
Accept: image/gif, image/jpeg, */*
Content-type: application/x-www-form-urlencoded
Content-length: 54
ak = MTCH-2009-1073-GEN&rd = http://www.match.com/
```

When the returned redirection message is received, another GET request is issued by the client computer system to the redirection target server, which is again "www.match.com."

In accordance with the present invention, a client-side process can also be utilized to transparently provide notification of the selection of a Web page element by a client computer system. FIG. 5 provides a representation 78 of the data transfer flows involved in both the server-side and client-side processes that implement the present invention. Common to both server-side and client-side process implementations, a client computer system 80 issues an initial Web page request over the Internet (not shown) to a Web page server system 82. A corresponding Web page 84 including a Web page element 86 is returned to the client computer system 80.

Again, common to both server-side and client-side process implementations of the present invention the Web page element 86 is provided through the embedding of information in the Web page 84. In the circumstance of a server-side process as generally depicted in FIG. 6, the process of the present invention following from a banner click 96 results in a client browser action. Specifically, the embedded information controls the operation of the Web browser on the client computer system sufficient to issue a notification URL 98 directed to the redirection target server system 88, as shown in FIG. 5. The server process 100 initiated in response to the notification URL receipt produces the redirection message that is returned to the client computer system 80. In connection with the generation of the redirection message, the server system 88 also logs and optionally processes the data received as part of the notification URL 98.

Based on the redirection message, the client computer system 80 then preferably issues an HTTP request 102 based on the information contained in the redirection message. Referring again to FIG. 5, the HTTP request 102 is provided via the Internet 14 to another Web page server system 90 that responds in a conventional manner by the serving of Web page 92 to the client computer system 80 as the Web page 104 that was inferentially referenced by the Web page element 86.

The method of the present invention utilizing a client-side process is generally shown if FIG. 7. The method 106, for the purposes of explanation here, generally begins in response to a banner click 108 to initiate a client process 110 executing in connection with the operation of the Web browser on the client computer system 80. In a preferred embodiment of the present invention, the client process 110 is provided with the Web page 84 to the client computer system 80. The client process 110 is invoked in response to the banner click and operates to first issue a notification URL message 112 and, second, to issue an HTTP request 114. Both messages are issued through the Internet 14 and to the target server system 88 and Web page server 90, respectively. The order that the client process 110 issues the notification URL 112 and HTTP request 114 is not significant. Further, acknowledgment of the receipt of the notification URL from the target server system 88 is not required prior to issuing the HTTP request 114. Indeed, as evident to the user of the client computer system 80, the only response recognized as significant is the receipt 116 of the Web page 92.

As in the case of the server-side process, the client-side process 110 can be implemented in a number of different manners that, for purposes of the present invention, each result in the delivery of data to the target server system 88 and a URL request to a Web page server system 90 to provide a Web page 92 having a prearranged correspondence with the Web page element 86. Specifically, the client-side process can be directly coded into the browser application or supplied as a browser plug-in to a conventional browser application. The client-side process can also be implemented through use of Java and JavaScript type applets.

An exemplary client-side process is implemented through the use of a Java Applet. The HTML code that is embedded in the Web page 84, for purposes of this example, is as follows:

```
< applet name = "ad" code = "ad.class" width = 468 height = 60 >
< param name = img value = "ad.gif" >
< param name = notifyurl value = "?MTCH-2009-1073-GEN" >
< param name = pageurl value = "http://catalog.online.com/" >
< /applet >
``` where the three applet parameters are defined as follows:

"img"—the URL reference to a graphic banner advertisement

"notifyurl"—the "notification" URL holding the accounting data

"pageurl"—the "redirection" URL to use

The applet source is as follows:

```
import java.applet.Applet;
import java.awt.Image;
import java.awt.Graphics;
import java.net.URL;
import java.net.MalformedURLException;
import java.io.IOException;
public class ad extends Applet {
    Image image;
    URL notifyurl;
    URL pageurl;
    public void init( ) {
        image = getImage(getDocumentBase( ), getParameter("img"));
        try {
            logurl = new URL(getDocumentBase( ),
            getParameter("notifyurl"));
            pageurl = new URL(getDocumentBase( ),
            getParameter("pageurl"));
        } catch (MalformedURLException e) { }
    }
    public void paint(Graphics g) {
        g.drawImage(image, 0, 0, this);
    }
    public boolean mouseDown(java.awt.Event evt, int x, int y) {
        try {
            logurl.openStream( ).close( );
        } catch (java.io.IOException e) { }
        getAppletContext( ).showDocument(pageurl);
        return true;
    }
}
```

The above example uses two HTTP requests to first issue the "notifyurl" message and, second, to issue the "pageurl" message. Various other protocols, however, can be used in connection with the present invention. For example, the Java applet can be modified to provide the notification data to the target server system 88 through use of a TCP connection. An exemplary implementation of an applet utilizing a TCP connection is provided below. The applet takes four parameters:
"img"—the URL of the ad image to show
"port"—the TCP port number to use on the target server
"data"—the accounting data to send to the target server
"pageurl"—the "redirection" URL to use
The applet source is as follows:

```
import java.applet.Applet;
import java.awt.Graphics;
import java.awt.Image;
import java.io.IOException;
import java.io.OutputStream;
import java.io.PrintStream;
import java.lang.Integer;
import java.lang.String;
import java.net.MalformedURLException;
import java.net.Socket;
import java.net.URL;
public class ad extends Applet {
    Image image;
    String host.data;
    int port;
    URL url;
    public void init( ) {
        image = getImage(getDocumentBase( ), getParameter("img"));
        host = getDocumentBase( ).getHost( );
        port = Integer.parseInt(getParameter("port"));
        data = getParameter("data");
        try {url = new URL(getDocumentBase( ), getParameter("pageurl"));}
        catch (MalformedURLException e) { }
    }
    public void paint(Graphics g) {
        g.drawImage(image, 0, 0, this);
    }
    public boolean mouseDown(java.awt.Event evt, int x, int y) {
        try {
            Socket socket = new Socket(host,port);
            PrintStream ps = new PrintStream(socket.getOutputStream( ));
            ps.print(data);
            ps.close( );
        } catch (java.io.IOException e) { }
        getAppletContext( ).showDocument(url);
        return true;
    }
}
```

Finally, the above applet can be referenced for execution by embedding the following HTML code into the Web page 84.

```
< applet name = "ad" code = "ad.class" width = 468 height = 60 >
< param name = img value = "ad.gif" >
< param name = port value = "21" >
< param name = data value = "MTCH-2009-1073-GEN" >
< param name = url value = "http://catalog.online.com/" >
</applet>
```

Thus, a comprehensive system and method for accounting or auditing accesses made by client computer systems to external hyper-linked servers has been described. The auditing capabilities of this system process impose optimally minimal overhead burden on the redirection server system while permitting the data that is gathered to be validated and reasonably assured to correspond to bona fide accesses to a redirection target server system.

While the invention has been particularly shown and described with reference to preferred embodiments thereof it will be understood by those skilled in the art that various changes in form and details may be made therein without departing from the spirit and scope of the invention.

The invention claimed is:

1. A method of operating a server, the method comprising:
serving a web page element including an embedded uniform resource locator, said embedded uniform resource locator including a redirection uniform resource locator and a redirection directive;
wherein said redirection directive includes a term or a code indicative of a redirection.

2. The method of claim 1, wherein said serving said web page element comprises serving said web page element to a client; and
wherein said embedded uniform resource locator results from a service request provided to said server by said client.

3. The method of claim 2, wherein said redirection uniform resource locator and said redirection directive are to redirect said client to a tracking server.

4. The method of claim 3 further comprising:
redirecting said client to said tracking server based at least in part on said embedded uniform resource locator.

5. The method of claim 4, wherein said tracking server is to redirect said client to a content server associated with said web page element.

6. The method of claim 2, wherein said redirection uniform resource locator and said redirection directive are to redirect said client to a content server associated with said web page element.

7. The method of claim 6 further comprising:
redirecting said client to said content server based at least in part on said embedded uniform resource locator.

8. The method of claim 7, wherein said content server is to redirect said client to a tracking server.

9. A method comprising:
receiving a web page element, said web page element including an embedded uniform resource locator, said embedded uniform resource locator including a redirection uniform resource locator and a redirection directive;
wherein said redirection directive includes a term or a code indicative of a redirection.

10. The method of claim 9, wherein said receiving of said web page element comprises receiving said web page element from a server; and wherein said embedded uniform resource locator results from a service request provided to said server by a client.

11. The method of claim 10, wherein said redirection uniform resource locator and said redirection directive are to redirect said client to a tracking server.

12. The method of claim 11 further comprising: redirecting said client to said tracking server based at least in part on said embedded uniform resource locator.

13. The method of claim 12, wherein said tracking server is to redirect said client to a content server associated with said web page element.

14. The method of claim 13, wherein said content server is to redirect said client to said tracking server.

15. A server comprising:
a CPU configured to serve a web page element including an embedded uniform resource locator, said embedded uniform resource locator including a redirection uniform resource locator and a redirection directive;
wherein said redirection directive includes a term or a code indicative of a redirection.

16. The server of claim 15, wherein said CPU is configured to serve said web page element to a client; and wherein said embedded uniform resource locator results from a service request provided to said server by said client.

17. The server of claim 16, wherein said redirection uniform resource locator and said redirection directive are to redirect said client to a tracking server.

18. The server of claim 17, wherein said CPU is further configured to redirect said client to said tracking server based at least in part on said embedded uniform resource locator.

19. The server of claim 18, wherein said tracking server is to redirect said client to a content server associated with said web page element.

20. The server of claim 16, wherein said redirection uniform resource locator and said redirection directive are to redirect said client to a content server associated with said web page element.

* * * * *